(12) United States Patent
Rose et al.

(10) Patent No.: US 8,635,134 B2
(45) Date of Patent: Jan. 21, 2014

(54) SYSTEMS AND METHODS FOR OPTIMIZATIONS INVOLVING INSUFFICIENT FUNDS (NSF) CONDITIONS

(75) Inventors: David T. Rose, Cumming, GA (US); Donald Henry Hopper, Jr., Stone Mountain, GA (US); Kejun Zhang, Atlanta, GA (US)

(73) Assignee: Fiserv, Inc., Brookfield, WI (US)

( * ) Notice: Subject to any disclaimer, the term of this patent is extended or adjusted under 35 U.S.C. 154(b) by 0 days.

(21) Appl. No.: 13/226,926

(22) Filed: Sep. 7, 2011

(65) Prior Publication Data

US 2013/0060669 A1 Mar. 7, 2013

(51) Int. Cl.
*G06Q 40/00* (2012.01)

(52) U.S. Cl.
USPC .............................. 705/35; 705/36

(58) Field of Classification Search
USPC ..................................... 705/35–40
See application file for complete search history.

(56) References Cited

U.S. PATENT DOCUMENTS

| | | |
|---|---|---|
| 6,196,458 B1 | 3/2001 | Walker et al. |
| 6,321,205 B1 | 11/2001 | Eder |
| 6,321,206 B1 | 11/2001 | Honarvar |
| 6,405,173 B1 | 6/2002 | Honarvar et al. |
| 6,658,393 B1 | 12/2003 | Basch et al. |
| 6,694,300 B1 | 2/2004 | Walker et al. |
| 6,708,155 B1 | 3/2004 | Honarvar et al. |
| 6,725,210 B1 | 4/2004 | Key et al. |
| 7,062,463 B2 | 6/2006 | Knapp |
| 7,117,208 B2 | 10/2006 | Tamayo et al. |
| 7,165,037 B2 | 1/2007 | Lazarus et al. |
| 7,296,734 B2 | 11/2007 | Pliha |
| 7,376,603 B1 | 5/2008 | Mayr et al. |
| 7,403,904 B2 | 7/2008 | Abe et al. |
| 7,519,553 B2 | 4/2009 | Abe et al. |
| 7,552,069 B2 | 6/2009 | Kepecs |
| 7,580,856 B1 | 8/2009 | Pliha |
| 7,610,257 B1 | 10/2009 | Abrahams |
| 7,617,156 B1 | 11/2009 | Wolfson |
| 7,720,761 B2 | 5/2010 | Trench et al. |
| 7,752,100 B1 | 7/2010 | Wasserman et al. |
| 7,813,951 B2 | 10/2010 | Eskandari |
| 7,813,952 B2 | 10/2010 | Eskandari |

(Continued)

OTHER PUBLICATIONS

American Marketing Association, "How Merrill Lynch Optimizes Inbound Interactions with Real-Time Decisioning" 2010 Software Presentation, 28 pages.

(Continued)

*Primary Examiner* — Thu Thao Havan
(74) *Attorney, Agent, or Firm* — Sutherland Asbill & Brennan LLP

(57) ABSTRACT

Systems and methods for optimizations involving insufficient funds conditions are provided. An identification of a first account of a customer of a financial institution may be received by a financial system comprising one or more computers. The first account may be a deposit account at the financial institution. Interest income and non-interest income attributable to one or more of a plurality of accounts, including the first account, that the customer has with the financial institution may be analyzed by the financial system. Based at least in part on the analyzed interest income and non-interest income, a recommended next action associated with the first account may be determined by the financial system. The recommended next action may be associated with an actual or potential insufficient funds (NSF) condition associated with the first account.

20 Claims, 5 Drawing Sheets

(56) References Cited

U.S. PATENT DOCUMENTS

| | | | |
|---|---|---|---|
| 7,813,983 | B2 | 10/2010 | Wottowa et al. |
| 7,814,019 | B2 | 10/2010 | Knapp |
| 7,831,467 | B1 | 11/2010 | Lefebvre et al. |
| 7,840,428 | B2 | 11/2010 | McNab et al. |
| 7,962,406 | B2 | 6/2011 | Bishop et al. |
| 7,996,307 | B2 | 8/2011 | Bishop et al. |
| 8,005,777 | B1 | 8/2011 | Owen et al. |
| 8,073,767 | B1 | 12/2011 | Trench et al. |
| 8,099,356 | B2 | 1/2012 | Feinstein et al. |
| 8,140,399 | B1 | 3/2012 | Goel |
| 8,145,535 | B2 | 3/2012 | Goel |
| 8,145,536 | B1 | 3/2012 | Goel |
| 8,165,920 | B2 | 4/2012 | Goel |
| 8,194,830 | B2 | 6/2012 | Chakraborty et al. |
| 8,199,901 | B2 | 6/2012 | Rani et al. |
| 8,249,231 | B2 | 8/2012 | Chakraborty et al. |
| 8,285,596 | B2 | 10/2012 | Sharma |
| 2002/0023051 | A1 | 2/2002 | Kunzle et al. |
| 2002/0116244 | A1 | 8/2002 | Honarvar et al. |
| 2002/0194096 | A1 | 12/2002 | Falcone et al. |
| 2002/0194117 | A1 | 12/2002 | Nabe et al. |
| 2003/0200135 | A1 | 10/2003 | Wright |
| 2004/0034558 | A1 | 2/2004 | Eskandari |
| 2004/0039593 | A1 | 2/2004 | Eskandari |
| 2004/0073520 | A1 | 4/2004 | Eskandari |
| 2004/0093271 | A1 | 5/2004 | Walker et al. |
| 2004/0111363 | A1 | 6/2004 | Trench et al. |
| 2004/0139010 | A1 | 7/2004 | McMichael et al. |
| 2004/0193537 | A1 | 9/2004 | Knapp |
| 2005/0021456 | A1 | 1/2005 | Steele et al. |
| 2005/0097028 | A1 | 5/2005 | Watanabe et al. |
| 2005/0273430 | A1 | 12/2005 | Pliha |
| 2005/0279824 | A1 | 12/2005 | Anderson et al. |
| 2007/0106558 | A1 | 5/2007 | Mitchell et al. |
| 2007/0124237 | A1 | 5/2007 | Sundararajan et al. |
| 2007/0156673 | A1 | 7/2007 | Maga et al. |
| 2007/0159481 | A1 | 7/2007 | Abe et al. |
| 2007/0185867 | A1 | 8/2007 | Maga et al. |
| 2007/0203827 | A1 | 8/2007 | Simpson et al. |
| 2008/0021813 | A1 | 1/2008 | Simpson et al. |
| 2008/0027749 | A1 | 1/2008 | Meyer et al. |
| 2008/0052234 | A1 | 2/2008 | Keohane et al. |
| 2008/0091530 | A1 | 4/2008 | Egnatios et al. |
| 2008/0215377 | A1 | 9/2008 | Wottowa et al. |
| 2008/0228511 | A1 | 9/2008 | Barden |
| 2008/0249844 | A1 | 10/2008 | Abe et al. |
| 2008/0275800 | A1 | 11/2008 | Abe et al. |
| 2009/0018937 | A1 | 1/2009 | Joao |
| 2009/0157449 | A1 | 6/2009 | Itani et al. |
| 2009/0171756 | A1 | 7/2009 | De Zilwa et al. |
| 2009/0171838 | A1 | 7/2009 | Liu et al. |
| 2009/0190729 | A1 | 7/2009 | Chakraborty et al. |
| 2009/0192809 | A1 | 7/2009 | Chakraborty et al. |
| 2009/0198610 | A1 | 8/2009 | Wu et al. |
| 2009/0222313 | A1 | 9/2009 | Kannan et al. |
| 2009/0234710 | A1 | 9/2009 | Belgaied Hassine et al. |
| 2009/0276289 | A1 | 11/2009 | Dickinson et al. |
| 2009/0276368 | A1 | 11/2009 | Martin et al. |
| 2009/0292583 | A1 | 11/2009 | Eilam et al. |
| 2009/0307074 | A1 | 12/2009 | Sharma |
| 2009/0327123 | A1 | 12/2009 | Wolfson |
| 2010/0057548 | A1 | 3/2010 | Edwards |
| 2010/0106585 | A1 | 4/2010 | Etheredge et al. |
| 2010/0106589 | A1 | 4/2010 | Etheredge et al. |
| 2010/0138282 | A1 | 6/2010 | Kannan et al. |
| 2010/0161379 | A1 | 6/2010 | Bene et al. |
| 2010/0179860 | A1 | 7/2010 | Noel et al. |
| 2010/0274687 | A1 | 10/2010 | Ghosh et al. |
| 2010/0306091 | A1 | 12/2010 | Homer et al. |
| 2010/0306094 | A1 | 12/2010 | Homer et al. |
| 2010/0312679 | A1 | 12/2010 | Lebouitz |
| 2011/0022454 | A1 | 1/2011 | Lefebvre et al. |
| 2011/0029431 | A1 | 2/2011 | Knapp |
| 2011/0131122 | A1* | 6/2011 | Griffin et al. ............ 705/35 |
| 2011/0131130 | A1 | 6/2011 | Griffin et al. |
| 2011/0131131 | A1 | 6/2011 | Griffin et al. |
| 2011/0178908 | A1 | 7/2011 | Benefield et al. |
| 2011/0191173 | A1 | 8/2011 | Blackhurst et al. |
| 2011/0191180 | A1 | 8/2011 | Blackhurst et al. |
| 2011/0246346 | A1 | 10/2011 | Satyavolu et al. |
| 2011/0251874 | A1 | 10/2011 | Banthia et al. |
| 2011/0295731 | A1 | 12/2011 | Waldron et al. |
| 2011/0313835 | A1 | 12/2011 | Falkenberg et al. |
| 2011/0313900 | A1 | 12/2011 | Falkenberg et al. |
| 2012/0004969 | A1 | 1/2012 | Satyavolu et al. |
| 2012/0004970 | A1 | 1/2012 | Satyavolu et al. |
| 2012/0010933 | A1 | 1/2012 | Satyavolu et al. |
| 2012/0022917 | A1 | 1/2012 | Lawton et al. |
| 2012/0023009 | A1 | 1/2012 | Pazlar et al. |
| 2012/0053972 | A1 | 3/2012 | Lawton et al. |
| 2012/0078766 | A1 | 3/2012 | Rose et al. |
| 2012/0078813 | A1 | 3/2012 | Rose et al. |
| 2012/0109802 | A1 | 5/2012 | Griffin et al. |
| 2012/0143735 | A1 | 6/2012 | Pascal Leo et al. |
| 2013/0054334 | A1 | 2/2013 | Ross et al. |
| 2013/0073386 | A1 | 3/2013 | Rose et al. |

OTHER PUBLICATIONS

"How Interaction Optimizer is changing the game at a major US investment management company" Portrait Software case study <www.portraitsoftware.com>. Nov. 2009, 2 pages.

"Apeno Uplift Optimizer for Signature." Fiserv, Inc. <www.signature.fiserv.com>, 2 pages.

"Apeno Customer Analytics for Signature." Fiserv, Inc. <VvWW.signature.fiserv.com 4 pages.

"Aperio Interaction Optimizer for Signature". Fiserv, Inc. <VvWW.signature.fiserv.com>, 2 pages.

Grosman, Penny, "Mitek Offers Card Balance Transfer Via Mobil Device", Sep. 8, 2011—2011 American Banker and SourceMedia, Inc. http://www.americanbanker.com/issues/176_175/mitek—mobil—card—balance—transfer—1042000-1.html?.

Non-Final Office Action for U.S. Appl. No. 12/893,841 mailed Dec. 22, 2011.

Final Office Action for U.S. Appl. No. 12/893,841 mailed May 7, 2012.

Non-Final Office Action for U.S. Appl. No. 12/893,822 mailed Aug. 20, 2012.

Non-Final Office Action for U.S. Appl. No. 12/893,841 mailed Sep. 26, 2012.

Final Office Action for U.S. Appl. No. 12/893,822 mailed Feb 27, 2013.

Final Office Action for U.S. Appl. No. 12/893,841 mailed Mar. 14, 2013.

Non-Final Office Action for U.S. Appl. No. 13/407,102 mailed Nov. 15, 2012.

Final Office Action for U.S. Appl. No. 13/407,102 mailed Apr. 12, 2013.

Non-Final Office Action for U.S. Appl. No. 13/237,583 mailed Mar. 13, 2013.

Final Office Action for related U.S. Appl. No. 13/237,583 mailed Jul. 18, 2013.

Non-Final Office Action for U.S. Appl. No. 13/407,111 mailed Aug. 7 2013.

* cited by examiner

SYSTEMS AND METHODS FOR OPTIMIZATIONS INVOLVING INSUFFICIENT FUNDS (NSF) CONDITIONS

FIELD OF THE INVENTION

Aspects of the invention relate generally to insufficient funds or not sufficient funds (NSF) conditions, and more particularly, to systems and methods for optimizations involving NSF conditions.

BACKGROUND OF THE INVENTION

Many financial institutions wish to provide a more tailored handling of NSF conditions for customers. Indeed, while NSF conditions can generate fee or income opportunities for financial institutions, the way in which the NSF conditions are handled can impact customer experiences, satisfaction, loyalty, and/or retention. Thus, there is an opportunity for systems and methods for optimizations involving NSF conditions.

BRIEF DESCRIPTION OF THE DRAWINGS

Reference will now be made to the accompanying drawings, which are not necessarily drawn to scale, and wherein.

DETAILED DESCRIPTION

Figure 1:
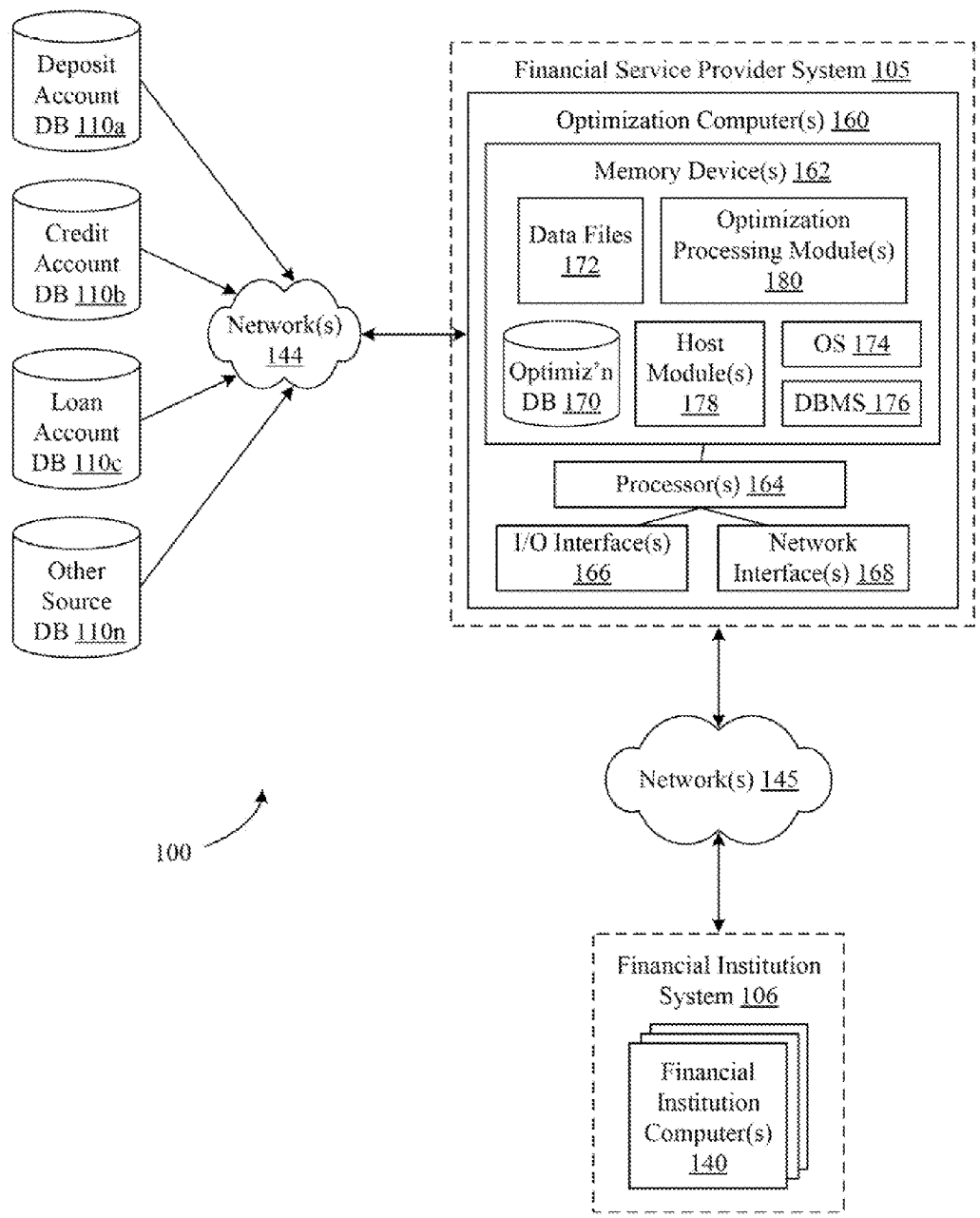
FIG. 1 illustrates a block diagram of an example system that supports optimizations involving NSF conditions, according to an illustrative embodiment of the invention.

The invention will now be described more fully hereinafter with reference to the accompanying drawings, in which example embodiments of the invention are shown. This invention may, however, be embodied in many different forms and should not be construed as limited to the example embodiments set forth herein; rather, these example embodiments are provided so that this disclosure will be thorough and complete, and will fully convey the scope of the invention to those of ordinary skill in the art. Like numbers refer to like elements throughout.

Embodiments of the invention may provide systems and methods for optimizations involving NSF conditions. These optimizations may take a wide variety of different factors into account, including but not limited to, interest income associated with a customer, non-interest (e.g., fee, etc.) income associated with the customer, customer segmentation, attrition risk, and/or a customer tolerance for paying NSF fees. In certain embodiments, an optimization may take a relatively holistic view of a customer's relationship with a financial institution (e.g., a bank, etc.). Additionally, as desired, optimizations may be performed in a reactive and/or in a proactive or anticipatory manner. For example, a relatively optimal best next action (BNA) may be reactively determined based upon the identification of an NSF situation. As another example, an overdraft limit amount may be proactively determined for a customer based at least in part upon an optimization.

It will be appreciated that the optimizations described herein, or at least a portion thereof, can be performed by a service provider, a financial institution, or a combination thereof on a periodic basis, based upon the identification of an event (e.g., an NSF event, etc.), and/or on an as-requested basis, according to one or more example embodiments of the invention. As an example, the service provider may operate as an application service provider (ASP) that supports interaction with a financial institution computer, and allows a user of the financial institution computer to identify or provide data of customers to be analyzed for optimizations, as well as any configuration options or preferences for performing the optimizations. The results of the optimizations can then be provided for access by a financial institution computer communicating with the service provider via one or more suitable networks. For example, the financial institution can have customer management software that receives the results of the optimizations performed by the service provider. In certain embodiments, a service provider may provide optimization functionality to a plurality of financial institutions, according to an example embodiment of the invention. In other embodiments, the service provider can be a unit of a financial institution that provides the optimization functionality to one or more units of the same financial institution, a subsidiary of the same financial institutions, or other financial institution(s) via networked financial institution computers. For example, the optimizations described herein may also be performed by optimization software running locally at a financial institution computer. In this regard, the financial institution computer can access, either locally or via a network, data for customers to be analyzed by optimizations, as well as any configuration options or preferences for performing the optimizations.

I. System Overview

FIG. 1 illustrates a block diagram of an example system 100 that supports optimizations involving NSF conditions, according to an illustrative embodiment of the invention. Although various computing devices and/or computers are illustrated in FIG. 1, it is appreciated that corresponding entities and/or individuals are associated with each of the computers illustrated. According to various embodiments, there may be: one or more financial service provider systems 105, each associated with one or more optimization computers 160, and one or more financial institution systems 106, each associated with one or more financial institution computers 140. In certain embodiments, the financial service provider systems 105 may be associated with a financial service provider entity, and the financial institution systems 106 may be associated with one or more financial institutions. According to various embodiments, there may be any number of each entity type, and each entity may be associated with any number of suitable systems, computers, computing devices, and/or other devices. For simplicity, the entities, systems, computers, and/or devices may be referenced in the singular, but it is appreciated that the same description applies to embodiments including multiple entities, systems, computers, and/or devices. Similarly, for each of the computers described herein, it is appreciated that the computer may include any number of suitable components and/or functionalities. Moreover, although detailed descriptions of system components are provided for the financial service provider system 105, it is appreciated that any of the financial institution systems 106 may be configured in any suitable manner, which may be similar to that described herein for the financial service provider system 105. In this regard, the financial institution computers can include one or more memory devices, processors, input/output (I/O) interfaces, and network interfaces. The one or more memory devices may store computer-executable instructions, which may be accessed and executed by the one or more processors to provide the functionality described herein with respect to the financial institution computers.

As shown in FIG. 1, the financial service provider system 105 and the financial institution system 106 may be in communication with each other via one or more suitable networks 145, which, as described below, can include one or more separate or shared private and/or public networks, including the Internet, a public switched telephone network, one or more local area networks, and/or one or more wide area networks. In addition, the financial service provider system 105, including at least one optimization computer 160, can have access to one or more databases 110a-n or other storage of data via one or more suitable networks 144, which may be the same as or different from networks 145. These components will now be discussed in further detail.

The financial service provider system 105 may include any number of optimization computers 160 that operate to obtain certain information associated with accounts of customers of one or more financial institutions, and further to perform one or more NSF optimizations based at least in part upon the account data of the customers. In addition, the one or more optimization computers 160 may communicate with any number of financial institution computers 140 to receive business rules, options, preferences, and/or constraints for performing one or more optimizations described herein, as well as to provide one or more results of the performed optimizations to any number of financial institution computers 140. An optimization computer 160 may be any suitable processor-driven device, such as, but not limited to, a server computer, a mainframe computer, one or more networked computers, a desktop computer, a personal computer, a digital assistant, a personal digital assistant, a digital tablet, an Internet appliance, an application-specific circuit, a microcontroller, a minicomputer, or any other processor-based device. The execution of suitable computer-implemented instructions by the optimization computer 160 may form a special purpose computer or other particular machine that is operable to facilitate the processing of the optimizations, as well as the receipt and output of data associated with the optimizations. Although a single optimization computer 160 is described herein, the operations and/or control of the optimization computer 160 may be distributed among any number of computers and/or processing components.

In addition to having one or more processors 164, the optimization computer 160 may include one or more memory devices 162, one or more input/output (I/O) interfaces 166, and one or more network interfaces 168. The memory devices 162 may be any suitable memory devices, for example, caches, read-only memory devices, random access memory devices, magnetic storage devices, removable storage devices, etc. Additionally, any number of logical data storage constructs may be stored as desired within the memory devices 162, such as an optimization database 170 and/or any number of other suitable databases. In addition or in the alternative, while databases 110a-n may be accessed via a network 144 in some embodiments, any of databases 110a-n may be stored within memory devices 162 without departing from example embodiments of the invention. The memory devices 162 may further store a wide variety of data, such as any number of data files 172. Additionally, the memory devices 162 may store executable instructions and/or various program modules utilized by the optimization computer 160, for example, an operating system (OS) 174, a database management system (DBMS) 176, an optimization processing module 180 and/or one or more host modules 178.

The data files 172 and/or the optimization database 170 may include any suitable data that facilitates the receipt and/or processing of data utilized in association with the NSF optimization processing. For example, the data files 172 and/or optimization database 170 may include data derived or received from databases 110a-n, any business rules, options, preferences and/or constraints received from one or more financial institution systems 106, and/or default business rules, options, preferences, and/or constraints, as well as processing results from the performed optimizations (e.g., recommended BNAs, determinations of overdraft limit amounts, etc.) that are made available to one or more financial institution systems 106. The optimization processing module 180 may store predictive models, calculation algorithms, processing logic, and/or various rules utilized to perform one or more NSF optimizations. In some example embodiments, the optimization processing module 180 may store processing logic, business rules, and/or other software that is less prone to change over time, while other logic, rules, predictive models, and/or calculation algorithms that are more likely to change or be modified may be stored in data files 172 and/or optimization database 170. Many variations of the optimization database 170, data files 172, and/or optimization processing module 180 are available in accordance with example embodiments of the invention. It is appreciated that the illustration of an optimization database 170 as a separate database from the data files 172 and/or any other data storage means is provided for illustrative purposes, and that any data may be stored in any arrangement, separate or together with other data stored by the optimization computer 160.

The OS 174 may be a suitable software module that controls the general operation of the optimization computer 160. The OS 174 may also facilitate the execution of other software modules by the one or more processors 164, for example, the optimization processing module 180 and/or the host module(s) 178. The OS 174 may be, but is not limited to, Microsoft Windows®, Apple OSX™, Linux, Unix, or a mainframe operating system. The host modules 178 may include any number of suitable host modules that manage interactions and communications between the financial service provider system 105 and external systems, such as financial institution system 106 (e.g., financial institution computer 140). In this regard, the host modules 178 can interface with other modules such as the optimization processing module 180 in order to facilitate the procurement, receipt, and/or processing of data from databases 110a-n, as well as business rules, options, preferences, and/or constraints from the financial institution system 106; and manage requests from one or more financial institutions and/or financial institution computer users (e.g., financial institution employees) to perform one or more NSF optimizations and/or requests to receive one or more results from the performed NSF optimizations.

Additionally, in certain embodiments, the host modules 178 may be configured to generate and/or to present a wide variety of different interfaces and/or graphical user interfaces, such as one or more interfaces that facilitate the receipt of data and/or requests from, or a presentation of results or other information, to the financial institution system 106 and/or financial service provider system 105. An interface can be in the form of one or more browser-based or Internet-based Web pages, although interfaces can also be presented through specialized software programs (e.g., stand-alone application, applet, mobile device application, etc.), according to an example embodiment of the invention. It will be appreciated that the interface can be formatted for display on a mobile device (e.g., personal communications device like a BlackBerry, iPhone, etc.) or non-mobile device (e.g., desktop computer, server computer, etc.), according to an example embodiment of the invention. The interface may be associated with security settings to enable access by certain registered users of the financial service provider system 105 and/or financial institution system 106. As desired, a private interface may be branded in accordance with specifications and/or preferences of a partner entity. Additionally, as desired in certain embodiments, the host modules 178 may be configured to provide a web services interface layer to another entity or component of the system 100.

The optimization processing module 180 may include one or more suitable software modules that are operable, configured, and/or programmed to identify recommended optimal actions associated with actual and/or potential NSF conditions. As desired, the optimization processing module 180 may evaluate a wide variety of account data associated with various accounts of customers of one or more financial institutions, such as deposit account data, credit account data, loan account data, and/or other types of account data. The optimization processing module 180 may additionally be configured to evaluate both interest and non-interest income associated with accounts. In certain embodiments, the optimization processing module 180 may be configured to evaluate account data in order to assign customers to various customer segments. The various customer segments may then be utilized during subsequent NSF optimization operations.

In certain embodiments, the optimization processing module 180 may be configured to invoke a wide variety of predictive models that evaluate customer account activity. For example, the optimization processing module 180 may be configured to invoke one or more predictive models that determine or calculate respective attrition risks associated with various customers. In certain embodiments, the optimization processing module 180 may be configured to evaluate account data in order to determine or calculate customer tolerances or NSF capacities. A customer tolerance is a sensitivity for incurring further or additional NSF fees. For example, the optimization processing module 180 may evaluate account and NSF fee data for a customer in order to determine a customer tolerance for paying an NSF fee. Indeed, the optimization processing module 180 may be configured to implement a wide variety of suitable processing methods and/or techniques as desired in various embodiments of the invention.

Additionally, the optimization processing module 180 may be configured to receive data from the optimization database 170, the data files 172, and/or from any number of external sources, such as the external databases 110*a-n* and/or the financial institution computers 140. The optimization processing module 180 may additionally be configured to communicate information associated with recommended BNAs to a wide variety of different recipients, such as the financial institution computers 140. As desired, a wide variety of different reporting functions may also be performed by the optimization processing module 180.

Additional details of the operations of the optimization processing module 180 and/or the financial service provider system 105 operating logic and functionality are provided below with reference to FIGS. 2-5.

With continued reference to the optimization computer 160, the one or more I/O interfaces 166 may facilitate communication between the optimization computer 160 and one or more input/output devices; for example, one or more user interface devices, such as a display, a keypad, a mouse, a pointing device, a control panel, a touch screen display, a remote control, a microphone, a speaker, etc., that facilitate user interaction with the optimization computer 160. For example, one or more service provider employees or potentially even financial institution employees may interact with the optimization computer 160 in order to establish various parameters associated with various operational aspects, to review optimization results, and/or to review various logs and/or reports. The one or more network interfaces 168 may facilitate connection of the optimization computer 160 to one or more suitable networks, for example, the network(s) 144, 145 illustrated in FIG. 1, or local area network(s) within the financial service provider system 105. In this regard, the optimization computer 160 may receive and/or communicate information to other components of the system 100, such as the databases 110*a-n* (either directly or via one or more computers managing databases 110*a-n*) and/or the financial institution systems 106. As desired, any number of Web pages, interface screens, and/or other presentations (e.g., graphical user interfaces, etc.) may be provided or presented to a financial institution system 106 via the network 145.

The databases 110*a-n* can provide a wide variety of account and/or transactional data associated with customers of any number of financial institutions. In one example embodiment of the invention, the databases 110*a-n* may include one or more of a deposit account database 110*a*, a credit account database 110*b*, a loan account database 110*c*, and/or any number of databases 110*n* associated with other information. The deposit account database 110*a* may include information associated with any number of deposit accounts that one or more customers have with any number of the financial institutions. A wide variety of information associated with a deposit account may be stored as desired, including but not limited to, account identification information (e.g., an account number, a financial institution identifier, etc.), customer identification information (e.g., identifying information for a customer associated with the deposit account, etc.), account type information (e.g., savings account, checking account, etc.), account parameter information (e.g., an interest rate associated with the account, a minimum balance associated with the account, etc.), account balance information, historical account balance information, (e.g., a monthly account balance over a predetermined historical period of time), and/or information associated with fees incurred in association with the deposit account (e.g., information associated with fees incurred over a predetermined historical period of time, etc.). As desired, a wide variety of scores, factors, and/or other derived values may additionally be associated with an account and/or a customer.

The credit account database 110*b* may include information associated with any number of credit accounts that one or more customers have with any number of the financial institutions. A wide variety of information associated with a credit account may be stored as desired, including but not limited to, account identification information (e.g., an account number, a financial institution identifier, etc.), customer identification information (e.g., identifying information for a customer associated with the credit account, etc.), account type information (e.g., a type of credit card provider associated with the credit account, account status information, etc.), account parameter information (e.g., an interest rate associated with the account, etc.), account balance information, historical account balance information, (e.g., a monthly account balance over a predetermined historical period of time), and/or information associated with interest collected in association with the credit account (e.g., information associated with average interest and/or total interest incurred over a predetermined historical period of time, etc.).

The loan account database 110c may include information associated with any number of loan accounts that one or more customers have with any number of the financial institutions. A wide variety of information associated with a loan account may be stored as desired, including but not limited to, account identification information (e.g., an account number, a financial institution identifier, etc.), customer identification information (e.g., identifying information for a customer associated with the loan account, etc.), account type information (e.g., an identifier of a type of loan account, account status information, etc.), an original principal amount, a loan inception data, a term of the loan, an interest rate associated with the loan, an amount of remaining interest to be paid, historical payment history information, and/or information associated with fees incurred in association with the loan (e.g., information associated with late fees incurred over a predetermined historical time period, etc.).

The other databases 110n may include a wide variety of other data that is accessible by the financial service provider system 105, such as other financial information associated with customers, algorithms and/or models utilized to provide optimization services, and/or various rules and/or preferences associated with financial institutions. In certain embodiments, the other databases 110n may include electronic bill presentment and/or payment (EBPP) information for the customers. Other examples of information that may be stored in another database 110n include, but are not limited to, customer loyalty information, customer rewards information (e.g., accumulated points, etc.), credit bureau information, and/or customer identity information.

As desired, one or more of the databases 110a-n may be maintained by a financial institution system 106. Alternatively, at least one of the databases 110a-n may be maintained by a third-party service provider or data source. Additionally, as desired, separate databases may be associated with different financial institutions. For example, the financial service provider system 105 may be configured to provide NSF optimization services for a plurality of different financial institutions, and a plurality of respective sources of information may be accessed in order to carry out these services.

Although not described or illustrated in detail, each financial institution computer 140 may be configured in the same or similar manner as described for the financial service provider system 105. For example, financial institution computer 140 may include one or more processor-based computers operable to store and execute computer-executable instructions, each having one or more processors, memories, I/O interfaces, network interfaces, operating systems, data files, databases or other data storage means, DBMS, host modules and other operating logic to perform some or all of the same or similar functions as are described herein with reference to the financial service provider system 105 (e.g., optimization computer 160).

The networks 144, 145 may include any number of telecommunication and/or data networks, whether public, private, or a combination thereof, including but not limited to, the Internet, a local area network, a wide area network, an intranet, intermediate handheld data transfer devices, public switched telephone networks, and/or any combination thereof and may be wired and/or wireless. The networks 144, 145 may also allow for synchronous, including real-time, and/or asynchronous, including batch, transactions to be transmitted thereover. Due to network connectivity, various methodologies described herein may be practiced in the context of distributed computing environments. Although the system 100 is shown for simplicity as including networks 144, 145, it is to be understood that any other network configuration is possible, which may optionally include a plurality of networks for each of networks 144, 145, each with devices such as gateways and routers, for providing connectivity between or among networks.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the invention should not be construed as being limited to any particular operating environment, system architecture, or device configuration.

II. Operational Overview

Figure 2:
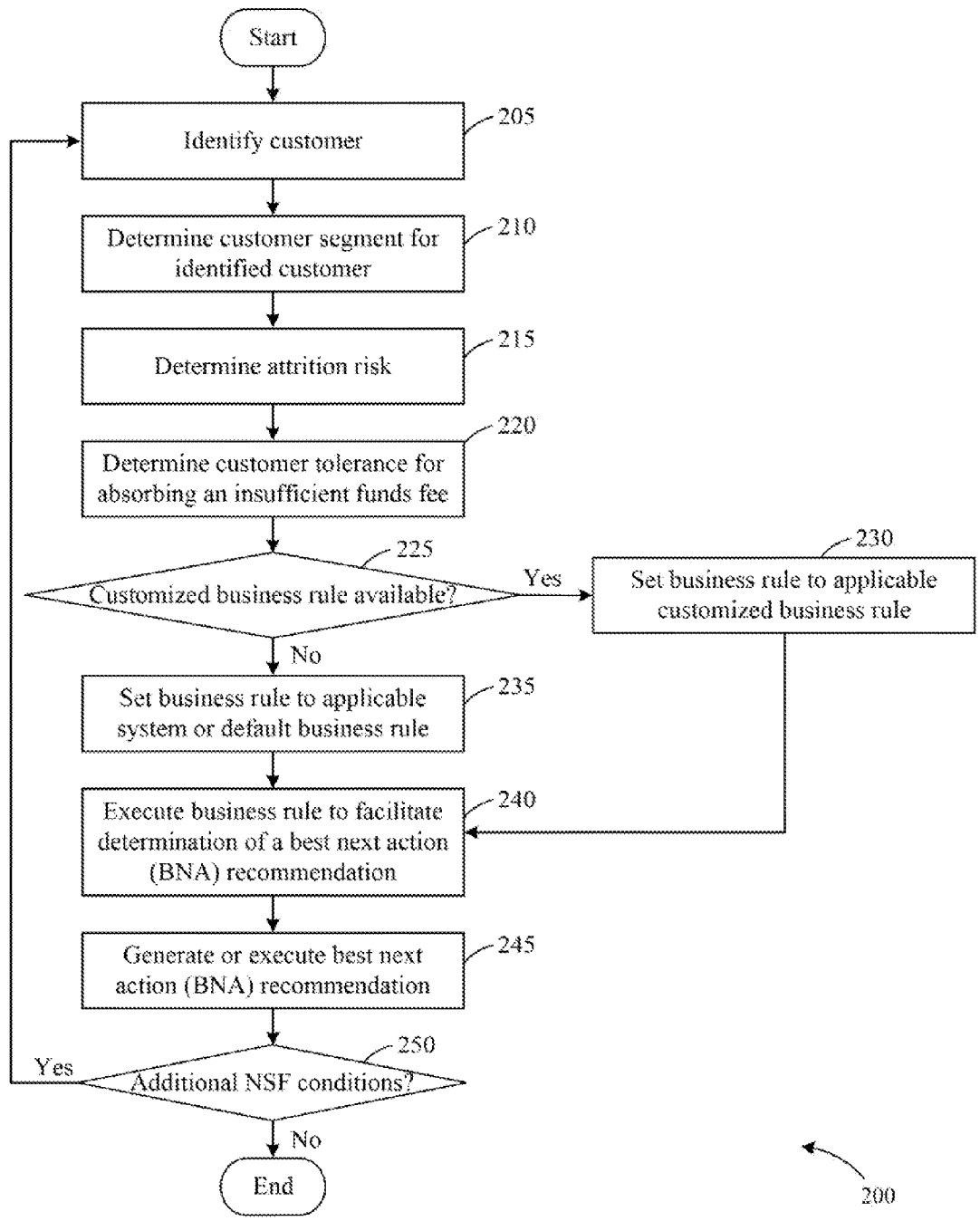
FIG. 2 illustrates a flow diagram of an example method for reactively recommending and/or implementing an action associated with an NSF condition, according to an illustrative embodiment of the invention.

In various embodiments of the invention, a wide variety of NSF optimizations may be performed. These NSF optimizations may include reactive and/or proactive NSF optimizations. For example, a best next action may be reactively determined based upon the identification of an NSF event or condition. As another example, an overdraft limit amount or other parameter may be proactively determined in order to address a potential NSF condition. FIG. 2 illustrates a flow diagram of an example method 200 for reactively recommending and/or implementing an action associated with an NSF condition, according to an illustrative embodiment of the invention. The method 200 may be performed by a suitable financial service provider system and/or associated optimization computers, such as the financial service provider system 105 and/or optimization computers 160 illustrated in FIG. 1. The method 200 may begin at block 205.

At block 205, a customer may be identified for an NSF optimization. In certain embodiments of the invention, the customer may be identified based upon the identification of an NSF condition or an NSF event. For example, a suitable financial institution system, such as the financial institution system 106 illustrated in FIG. 1, may provide information associated with an NSF condition, such as a returned check, a failed debit transaction, or other NSF condition, to the financial service provider system 105. The customer may then be identified based at least in part upon the received information associated with the NSF event. For example, received customer identification information (e.g., customer name, etc.) may be utilized to identify the customer. As another example, received account identification information (e.g., an account number, etc.) may be evaluated, and a customer associated with the account may be identified.

At block 210, a customer segment for the identified customer may be determined. In certain embodiments, a customer may be assigned to a group or segment of similar customers. In one example embodiment, a customer segment may be a customer classification associated with a value of the customer to the financial institution. A wide variety of different customer segments and/or types of customer segments may be utilized as desired in various embodiments of the invention. These various customer segments may take a wide variety of different factors and/or considerations into account, such as the respective incomes generated by the customers for the financial institution. In certain embodiments, both interest income and non-interest income (e.g., fees, etc.) associated with a customer may be considered when determining a customer segment. A wide variety of different criteria associated with various customer accounts may be evaluated in order to determine interest and/or non-interest income for the customer. These criteria may include any number of current account attributes and/or historical account attributes, such as information associated with current account balances, historical account balance information, interest rate information, and/or information associated with fees. Once evaluated, the customer may be assigned to a suitable customer segment. For example, determined values for interest and non-interest income may be utilized to assign the customer to a customer segment.

One example of an evaluation that may be utilized to assign a customer to a customer segment will now be described. Information associated with one or more customer accounts with the financial institution may be obtained. For example, account information may be obtained from one or more suitable financial institution systems 106, such as one or more "core account" systems associated with the financial institutions. Additionally, as desired, a wide variety of suitable models, formulas, and/or other information utilized to evaluate the customer accounts (e.g., industry-standard net interest margin values for various account types, etc.) may be obtained from one or more suitable data sources, such as the financial institution systems 106 and/or various third-party data sources. A wide variety of techniques may be utilized to obtain the desired information. For example, data may be periodically (e.g., once a day, once a week, once a month, etc.) received from a data source utilizing either a "push" (i.e., received without being requested) or a "pull" (i.e., received in response to a request) method, and at least a portion of the received data may be stored for subsequent processing. As another example, data may be obtained in a "just-in-time" manner when desired for processing. For example, an optimization computer 160 may request data during the determination of a customer segment. As another example, a financial institution computer 140 may communicate data to the optimization computer 160 based upon the identification of an NSF condition.

As desired, the data evaluated in a customer segment determination may include data associated with a wide variety of different customer accounts, such as one or more credit accounts, one or more deposit accounts, and/or one or more loan accounts that the customer has with the financial institution. With respect to credit accounts, it may be possible for the optimization computer 160 to obtain and evaluate individual credit account information. For embodiments in which individual credit account information is not available, the information that may be evaluated for a credit account includes, but is not limited to, an account type, a current monthly balance, monthly balances that have been collected for a predetermined historical period of time (e.g., the last six months, the last year, etc.), and/or a net interest margin, such as a net interest margin derived from applicable industry standards. For example, an industry average for interest income derived from a credit card customer may be utilized to determine a net interest margin for the credit account. In embodiments in which individual credit account information is available, it may be possible to perform a more detailed evaluation of the credit account. For example, the average interest incurred for a predetermined historical period of time, a current account balance, and/or an applicable interest rate for the account may be evaluated.

Examples of data that may be evaluated for a deposit account include, but are not limited to, an account type, a monthly balance for a predetermined historical period of time (e.g., the last six months, the last year, etc.), a net interest margin, and/or fees incurred for a predetermined historical period of time (e.g., account maintenance fees, NSF fees, etc.). In certain embodiments, the net interest margin may be derived from applicable industry standards. For example, an industry average for interest income derived from financial institution investment of funds on deposit may be utilized to determine a net interest margin. Examples of data that may be evaluated for a loan account include, but are not limited to, an original principal amount for the loan, a loan inception data, a term of the loan, an interest rate for the loan, an amount of remaining interest to be paid, information associated with additional principal payments made by the consumer, information associated with pre-paid interest payments made by the consumer, information associated with fees (e.g., late charges) incurred over a predetermined historical period of time (e.g., the last six months, the last year, the life of the loan, etc.), and/or information associated with escrow payments (e.g., float income earned from escrow accounts, etc.).

Figure 3:
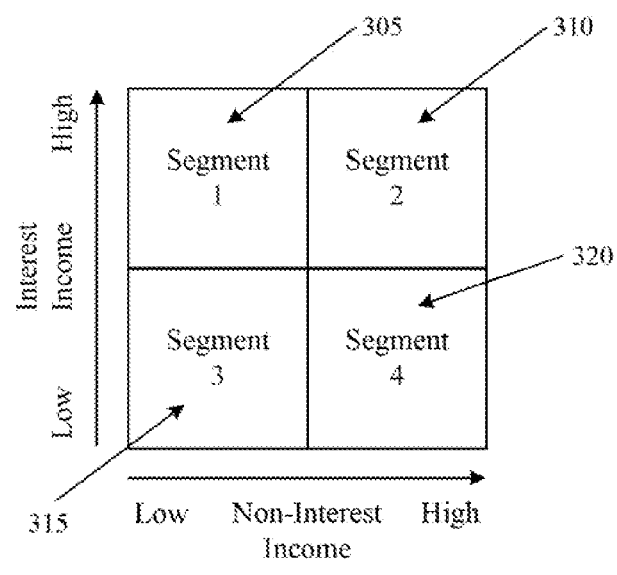
FIG. 3 illustrates a visual diagram of example customer segments that may be utilized in association with various embodiments of the invention.

Once customer account data has been obtained (or accessed from memory), at least a portion of the customer account data may be evaluated in order to determine a customer segment for the customer. For example, interest income and non-interest income for the customer may be determined based upon an analysis of the customer account data. A wide variety of different types of income determination may be made, such as historical determinations over a period of time, average income determinations, and/or projected income determinations. The interest income and non-interest income may then be utilized to assign the customer to an appropriate customer segment or customer value group. As mentioned above, a wide variety of different customer segments may be utilized as desired in various embodiments of the invention. FIG. 3 illustrates a visual diagram 300 of example customer segments that may be utilized. With reference to FIG. 3, four customer segments 305, 310, 315, 320 may be available for customer assignment. Each of these customer segments 305, 310, 315, 320 may be associated with different combinations of interest and non-interest income amounts.

A first customer segment 305 may be utilized for customers associated with relatively high interest income and relatively low non-interest income. A customer situated in the first customer segment 305 (referred to as a first segment customer) typically generates substantial interest income for the financial institution as a result of maintaining relatively high account balances and/or as a result of generating relatively high credit and/or loan interest. Additionally, a first segment customer is typically associated with a relatively low occurrence of NSF conditions, thereby resulting in relatively low non-interest income. As a result of the account relationship(s) with the financial institution, a first segment customer is also typically a "sticky" customer for the financial institution. Thus, it may be relatively unlikely that a first segment customer will attrite to another financial institution. Additionally, a first segment customer may typically exhibit sensitivity to service charges and/or account-related fees, such as NSF fees.

A second customer segment 310 may be utilized for customers associated with relatively high interest income and relatively high non-interest income. The second customer segment 310 may be the highest revenue-generating segment of financial institution customers. Example customers situated in the second customer segment 310 (referred to as second segment customers) may maintain relatively high account balances and/or generate substantial credit and/or loan interest, and incur a relatively high number of account-related fees (e.g., NSF fees, etc.). A second segment customer is typically a "sticky" customer for the financial institution.

Thus, it may be relatively unlikely that a second segment customer will attrite to another financial institution. Additionally, a second segment customer may typically exhibit less sensitivity to service charges and/or account-related fees, such as NSF fees, than a first segment customer.

A third customer segment 315 may be utilized for customers associated with relatively low interest income and relatively low non-interest income. The third customer segment 315 may be the lowest revenue-generating segment of financial institution customers. A customer situated in the third customer segment 315 (also referred to as a third segment customer) typically maintains relatively low account balances and/or typically does not generate substantial credit and/or loan interest. Additionally, a third segment customer typically incurs a lower number of account-related fees, such as NSF fees. As a result of the relatively modest account relationships, a third segment customer typically has relatively low "stickiness" to the financial institution and may be relatively likely to attrite.

A fourth customer segment 320 may be utilized for customers associated with relatively low interest income and relatively high non-interest income. A customer situated in the customer segment 320 (also referred to as a fourth segment customer) typically maintains relatively low account balances and/or typically does not generate substantial credit and/or loan interest. Additionally, a fourth segment customer typically incurs a relatively high number of account-related fees, such as NSF fees. As a result of the relatively modest account relationships, a third segment customer typically has relatively low "stickiness" to the financial institution. These modest relationships are typically insufficient to overcome any negativity associated with account-related fees. Accordingly, a fourth segment customer may be relatively likely to attrite, and the generation of fees may trigger the attrition.

In certain embodiments, each of the example customer segments 305, 310, 315, 320 may be associated with respective threshold values for interest and non-interest income. For example, interest income that exceeds a certain interest income threshold value (i.e., "high" interest income) may result in a customer being assigned to either the first customer segment 305 or the second customer segment 310. Otherwise, the customer may be a relatively "low" interest income customer that is assigned to either the third customer segment 315 or the fourth customer segment 320. As another example, non-interest income that exceeds a certain non-interest income threshold value (i.e., "high" non-interest income) may result in a customer being assigned to either the second customer segment 310 or the fourth customer segment 320. Otherwise, the customer may be a relatively "low" non-interest income customer that is assigned to either the first customer segment 305 or the third customer segment 315.

The customer segments 305, 310, 315, 320 illustrated in FIG. 3 are provided by way of example only. As desired, less than or more than the customer segments illustrated in FIG. 3 may be utilized. For example, segments may be provided for any number of combinations of high, medium, and low interest and/or non-interest income. Additionally, as desired, any number of other evaluations and/or determinations may be utilized to assign customers to segments. For example, customers may be scored in accordance with a wide variety of different factors, and the customers may be assigned to segments based at least in part upon the scores.

With continued reference to block 210 of FIG. 2, a wide variety of suitable methods and/or techniques may be utilized to assign a customer to a customer segment. As one simplified example, information associated with credit and/or deposit accounts may be evaluated in order to determine interest income for the customer. Additionally, deposit account information may be evaluated in order to determine non-interest income (e.g., NSF fees, etc.) for the customer. For each account, monthly interest income may be approximated utilizing any number of suitable techniques. Utilizing a deposit account as an example, an average monthly balance may be calculated or determined for the account by averaging one or more actual monthly balances for a predetermined historical time period. An industry standard net interest margin value, or a financial institution's actual product level net interest margin value, may then be multiplied or otherwise combined with the average monthly balance in order to calculate interest income for the deposit account. Utilizing a credit account as another example, an average of actual monthly interest incurred for a predetermined historical period of time may be calculated. Additionally or alternatively, a prediction of monthly interest may be determined based upon a current account balance, a percentage of the account balance that is typically carried forward (e.g., a percentage determined from historical data, etc.), and an applicable interest rate. As an example of determining non-interest income, historical fee data for a deposit account may be evaluated. In certain embodiments, the total fees (e.g., NSF fees, stop check fees, wire transfer fees, check reorder fees, overdraft protection charge fees, account maintenance fees, etc.) for a previous month may be determined. Certain fees may be recurring fees (e.g., account maintenance fees, etc.) and other fees may be one-time fees or fees generated based upon the identification of an event (e.g., NSF fees, stop check fees, etc.). In other embodiments, a monthly average of fees over a predetermined historical time period (e.g., three months, six months, a year, etc.) may be determined.

Once the various accounts of the customer have been evaluated, a total interest income value and a total non-interest income value may be determined for the customer. As an example of determining a total interest income value, the respective interest income values for each of the customer's credit and deposit accounts may be summed together. Similarly, as an example of determining a total non-interest income value, the respective non-interest income values for each of the customer's deposit accounts may be summed together. In certain embodiments, historical data that predates current account periods (e.g., data that is greater than one month or 30 days old, etc.) may be utilized in a determination of the total interest income value and/or the total non-interest income value. The determined total interest and non-interest income values may then be compared to one or more threshold values and/or ranges of values associated with assigning the customer to a customer segment.

A wide variety of different threshold values may be utilized as desired. For example, given the four customer segments set forth in FIG. 3, a total interest income threshold value "X" and a total non-interest income threshold value "Y" may be utilized. The determined total interest income and non-interest income values for the customer may then be evaluated utilizing the two threshold values "X" and "Y." Based at least in part upon the evaluation, the customer may be assigned to one of the four customer segments illustrated in FIG. 3. Example equations for identifying a customer segment for the customer are set forth below:

If (total interest income>"X") AND (total non-interest income<"Y"), then customer is assigned to segment "1"

If (total interest income>"X") AND (total non-interest income>"Y"), then customer is assigned to segment "2"

If (total interest income<"X") AND (total non-interest income<"Y"), then customer is assigned to segment "3"

If (total interest income<"X") AND (total non-interest income>"Y"), then customer is assigned to segment "4"

In certain embodiments, once a customer segment has been determined for the customer, an indicator of the customer segment may be stored. In this regard, the determined customer segment may be utilized in association with subsequent processing for the customer. For example, the customer segment may be utilized to process subsequently identified NSF conditions or potential NSF conditions. As desired in certain embodiments, a customer segment assignment for a customer may be reevaluated on a periodic or event-driven basis. For example, account-related information for a customer may be periodically reevaluated (e.g., once a month, once every three months, etc.), and updates to the customer segment assignment may be performed. As another example, a customer segment assignment may be reevaluated based at least in part upon the identification of one or more predetermined conditions, such as the opening of a new account, the change of an account status, or the incidence of a predetermined number of NSF fees.

The example set forth above for calculating interest and non-interest income and determining a customer segment is a relatively simple example and is not intended to be limiting. A wide variety of other factors and/or processing techniques may be utilized as desired in various embodiments of the invention. For example, interest and/or non-interest income associated with loan accounts may be determined. As another example, one or more models may be utilized to determine or calculate expected interest and/or non-interest income.

Following the determination of a customer segment at block 210, operations may continue at block 215. At block 215, an attrition risk may be determined for the customer. The determination of the attrition risk may be independent of an attrition risk associated with a customer segment for the customer. In certain embodiments, one or more predictive models may be invoked and/or utilized in order to determine an attrition risk for the customer. The attrition risk may be expressed, for example, as a probability or a score within an applicable range. The one or more predictive models utilized to evaluate the customer may be identified and/or selected based at least in part upon a wide variety of different factors, such as one or more customer attributes. As one example, a predictive model may be identified based upon the tenure of the customer with the financial institution. A few examples of predictive models that may be utilized are described in U.S. patent application Ser. No. 12/893,822, filed Sep. 29, 2010 and entitled "Systems and Methods for Customer Value Optimization Involving Product/Service Optimization," and in U.S. patent application Ser. No. 12/893,841, filed Sep. 29, 2010 and entitled "Systems and Methods for Customer Value Optimization Involving Relationship Optimization." Each of these applications is incorporated by reference herein in its entirety.

A wide variety of different types of predictive models may be utilized, such as logistic regression models, neural network models, and/or other types of models. In certain embodiments, a model may be generated by evaluating historical data associated with financial institution customers, including historical data associated with customers that closed accounts with the financial institution. For example, historical data may be obtained from the core account systems of one or more financial institutions, and the historical data may be processed in order to generate an attrition model. The process of devising an attrition model may involve the identification of one or more data attributes that provide a best indication of customer attrition and/or determining appropriate weightings of the attributes and/or relationships between the attributes. In this regard, customer values for the attributes may be provided to the model in order to predict customer attrition. As desired, a model may be specific to a particular financial institution or, alternatively, the model may have a scope that encompasses a plurality of financial institutions. Additionally, a model may be adjusted based upon the presence of new data. For example, a model may be periodically adjusted, or a model may be adjusted following the identification of a predetermined event.

Once generated, a predictive model may be utilized to evaluate data associated with a customer in order to determine an attrition risk associated with the customer. In certain embodiments, historical account data for the customer, such as relatively recent transactional data for a predetermined past period, may be collected, and at least a portion of the historical account data may be provided to and/or run through a predictive model. In certain embodiments, data may be periodically obtained (e.g., once a day, once a week, once a month, etc.) from a financial institution system 106, and at least a portion of the data may be stored for subsequent evaluation utilizing the model. In other embodiments, data may be acquired in a "just-in-time" manner when desired for processing. The predictive model may be utilized to evaluate any number of components of the data. For example, the predictive model may identify and evaluate attributes of the data that have been determined to be significant indicators of attrition risk. In this regard, the predictive model may calculate an attrition risk for the customer. In certain embodiments, the predictive model may evaluate account activity patterns irrespective of the actual or potential incidence of fees. As a result of examining a variety of account relationships and activity other than simply the charging of fees, a predictive model may identify an attrition risk that may otherwise go undetected.

A wide variety of different formats may be utilized to represent a determined attrition risk. For example, an attrition risk may be represented as a probability value in the range of zero to one or as a score within some other range of possible values. In certain embodiments, once an attrition risk has been determined for the customer, the determined attrition risk may be stored. In this regard, the determined attrition risk may be utilized in association with subsequent processing for the customer. For example, the attrition risk may be utilized to process subsequently identified NSF conditions or potential NSF conditions. As desired in certain embodiments, an attrition risk for a customer may be periodically reevaluated. For example, account-related information for a customer may be periodically reevaluated (e.g., once a month, once every three months, etc.) utilizing one or more appropriate models, and the attrition risk may be updated. In other embodiments, an attrition risk may be reevaluated based at least in part upon the identification of one or more predetermined conditions, such as the opening of a new account, the change of an account status, or the incidence of a predetermined number of NSF fees.

At block 220, a customer tolerance or capacity for absorbing an NSF fee, hereinafter referred to as a customer tolerance, may be determined or calculated. A wide variety of suitable formats may be utilized to represent the customer tolerance. For example, in certain embodiments, the customer tolerance may be represented by a ratio of cumulative NSF fees to cumulative deposits for some period of time across a plurality of financial institution accounts for the customer. As desired, the ratio may be determined by evaluating some amount of historical data. A determined ratio may be a measure of the customer's ability to absorb fees. The higher the value of the ratio, the more difficult it may be for the customer to absorb a fee, and therefore, the greater the likelihood of an account closure.

A wide variety of suitable methods and/or techniques may be utilized as desired to calculate a customer tolerance for the customer. In certain embodiments, historical account data for the customer, such as historical deposit and fee data, may be collected, and at least a portion of the historical account data may be evaluated. In certain embodiments, data may be periodically obtained (e.g., once a day, once a week, once a month, etc.) from a financial institution system 106, and at least a portion of the data may be stored for subsequent evaluation. In other embodiments, data may be acquired in a "just-in-time" manner when desired for evaluation. Once obtained, the data may be evaluated utilizing any number of suitable formulas that calculate a customer tolerance, such as the formula set forth in equation one (1) below:

$$Customer\_Tolerance_{ij} = \frac{\sum_{t=L1}^{L2} NSF\_Fees_{ijt}}{\left[\frac{\left(\sum_{t=C1}^{C2} Credits_{ijt}\right)}{(C2-C1)}\right]} \quad (1)$$

With respect to equation (1), the customer is represented by the variable "i", time is represented by the variable "j", L1 and L2 respectively represent the start and end points for evaluating NSF fees, and C1 and C2 respectively represent the start and end points for evaluating credits or deposits. Accordingly, equation (1) may be utilized to calculate a ratio of cumulative NSF fees to cumulative deposits (i.e., credits) across any number of accounts for any suitable predetermined historical time period. The determined ratio may be an indicator of the ability of the customer to absorb an additional NSF fee.

In certain embodiments, once a customer tolerance has been determined for the customer, the determined customer tolerance may be stored. In this regard, the determined customer tolerance may be utilized in association with subsequent processing for the customer. For example, the customer tolerance may be utilized to process subsequently identified NSF conditions or potential NSF conditions. As desired in certain embodiments, a customer tolerance for a customer may be periodically reevaluated. For example, account-related information for a customer may be periodically reevaluated (e.g., once a month, once every three months, etc.), and the customer tolerance may be updated. In other embodiments, a customer tolerance may be reevaluated based at least in part upon the identification of one or more predetermined conditions, such as the opening of a new account, the change of an account status, or the incidence of a predetermined number of NSF fees.

Following the determination at block 220 of a customer tolerance for absorbing an NSF fee, one or more business rules to execute may be identified based on one or more of the determined customer segment, attrition risk, and/or customer tolerance, as well as potentially one or more other data attributes associated with the customer. In certain embodiments, the use of these factors by the business rules may produce a result that may be utilized to determine an action for processing the NSF condition. A wide variety of different business rules may be executed as desired in various embodiments. The business rules may include default business rules and/or business rules (e.g., customized business rules) specified by a client of the financial service provider, such as a financial institution. A business rule may apply to any number of the factors described in blocks 210, 215, and 220. Additionally, as desired, a business rule may take additional factors into consideration. In certain embodiments, a plurality of business rules may be applicable to the relevant factors, and a suitable hierarchy of business rules may be established and utilized to select applicable business rules and/or an order for implementing business rules. Additionally, in certain embodiments, various rules may be associated with different financial institution objectives (e.g., maximization of non-interest income, retention of customers, etc.). Accordingly, it may be possible that a plurality of rules are applicable, and one or more rules may be identified and/or selected in accordance with the financial institution objectives.

At block 225, a determination may be made as to whether a customized business rule is currently applicable. For example, a determination may be made as to whether a client-specified business rule is applicable to an NSF condition involving any number of the determined factors (e.g., the determined customer segment value, the determined attrition risk, the determined customer tolerance, etc.). Assuming a determined customer segment of "X", a determined attrition risk score of "Y", and a determined customer tolerance of "Z", a determination may be made as to whether a client-specified business rule is applicable to the determined values. If it is determined at block 225 that a customized or client-specified business rule is applicable, then operations may continue at block 230. At block 230, an identification of a business rule to be executed may be set to the customized business rule. Operations may then continue at block 240 described in greater detail below.

If, however, it is determined at block 225 that a customized or client-specified business rule is not applicable, then operations may continue at block 235. At block 235, an applicable default or financial service provider system business rule may be identified, and the identification of the business rule to be executed may be set to the default business rule. A wide variety of default business rules may be utilized as desired in various embodiments of the invention. In certain embodiments, default business rules may be generated by the financial service provider system 105 based upon an analysis of historical customer data (e.g., attrition data, etc.) for any number of customers over a predetermined period of time (e.g., the last six months, the last year, etc.). During the analysis, suitable cutoff points and/or thresholds may be identified for attrition risk and/or customer tolerance. In certain embodiments, respective cutoff points and/or thresholds may be determined for different customer segments. As desired, default business rules may be subsequently modified by financial institution clients of the financial service provider. In this regard, client preferences that differ from default assumptions may be captured. Following the setting of a default business rule as an applicable business rule at block 235, operations may continue at block 240.

Any number of business rules may be established and/or utilized as desired in various embodiments of the invention. As desired, a given business rule may emphasize a desired factor or result. In certain embodiments, a business rule may emphasize a desired result given a particular client objective or goal. For example, a business rule may be intended to maximize non-interest income for a financial institution client. As another example, a business rule may be intended to minimize attrition risk. A wide variety of different business rules may be associated with these and other objectives. Additionally, in certain embodiments, a client may specify whether a specific or a default business rule will be utilized. For example, a client may specify that a particular business rule will be utilized for a given analysis of one or more actual and/or potential NSF conditions. In certain embodiments, an NSF condition may be evaluated a plurality of times utilizing different business rules. In this regard, various options for a next best action may be determined.

At block 240, which may be reached from either block 230 or block 235, the applicable business rule may be executed or applied in order to determine a best next action ("BNA") recommendation. In certain embodiments, the execution of a business rule produces a value that may be associated with a recommended BNA. An example of a business rule is set forth below:

IF (segment="1") AND (attrition risk>0.7) AND (customer tolerance>0.01), THEN rule result="X"

Following the execution of the business rule to produce the result of "X," the result may be utilized to determine a BNA to be recommended in association with the identified NSF condition. For example, the result may be mapped to a previously stored BNA utilizing a suitable mapping or lookup table. A wide variety of different BNAs may be utilized as desired in various embodiments. Given the particular mix of conditions associated with the example business rule, the intent or objective may be to retain a customer that has relatively high interest income. Accordingly, the recommended BNA may be an action to "waive an NSF fee if requested by the customer." In such a situation, the long-term benefits of the high interest income may outweigh the loss of income that would be generated by the NSF fee. Other business rules may be applicable to other customer segments, other attrition risks, and/or other customer tolerance levels. Additionally, these business rules may be associated with goals other than customer retention, such as maximizing NSF fee income or maximizing total projected income for a future period of time. Examples of other recommended BNAs include, but are not limited to, a recommendation to do nothing and allow an NSF fee to be charged, a recommendation to extend the customer an offer for a short-term loan or an easy advance in order to cover the NSF situation, a recommendation to waive the NSF fee if requested, a recommendation to discount the NSF fee if requested, a recommendation to proactively (i.e., without request) waive the NSF fee, and/or a recommendation to proactively discount the NSF fee.

At block 245, a BNA recommendation may be generated and/or executed. For example, a message including information associated with a recommended BNA may be communicated to a financial institution computer 140. In certain embodiments, the message may be communicated in response to a received request to determine a recommended BNA. As another example, implementation or execution of the recommended BNA may be instructed. For example, an instruction to implement a recommended BNA may be communicated to a suitable financial institution computer 140.

At block 250, a determination may be made as to whether any additional NSF conditions are to be evaluated and/or handled. If it is determined at block 250 that an additional NSF condition is to be evaluated, then operations may continue at block 205, in which a customer associated with a next NSF condition may be identified. If, however, it is determined at block 250 that no additional NSF conditions are to be evaluated, then operations may end.

The method 200 may end following block 250.

FIG. 2 describes an example process for reactively determining and/or implementing a recommended BNA in response to an identified NSF condition. Embodiments of the invention may also be utilized to proactively provide NSF optimization. For example, a respective overdraft limit amount may be determined for each of any number of demand deposit accounts in a proactive or anticipatory manner. As desired, any number of customers may be evaluated in order to determine respective overdraft limits. In this regard, a financial institution may establish tailored limits to various customers and/or groups of customers. As desired, these limits may be based on perceived risk and/or profit potential associated with the various customers. According to an aspect of the invention, a proactive NSF optimization for a customer may take a wide variety of customer factors into consideration, such as the customer's relationships with the financial institution, the value of the customer to the financial institution, and/or an attrition risk for the customer. In certain embodiments, these factors may be evaluated in a holistic manner in order to account for the totality of the customer's relationships with the financial institution.

Figure 4:
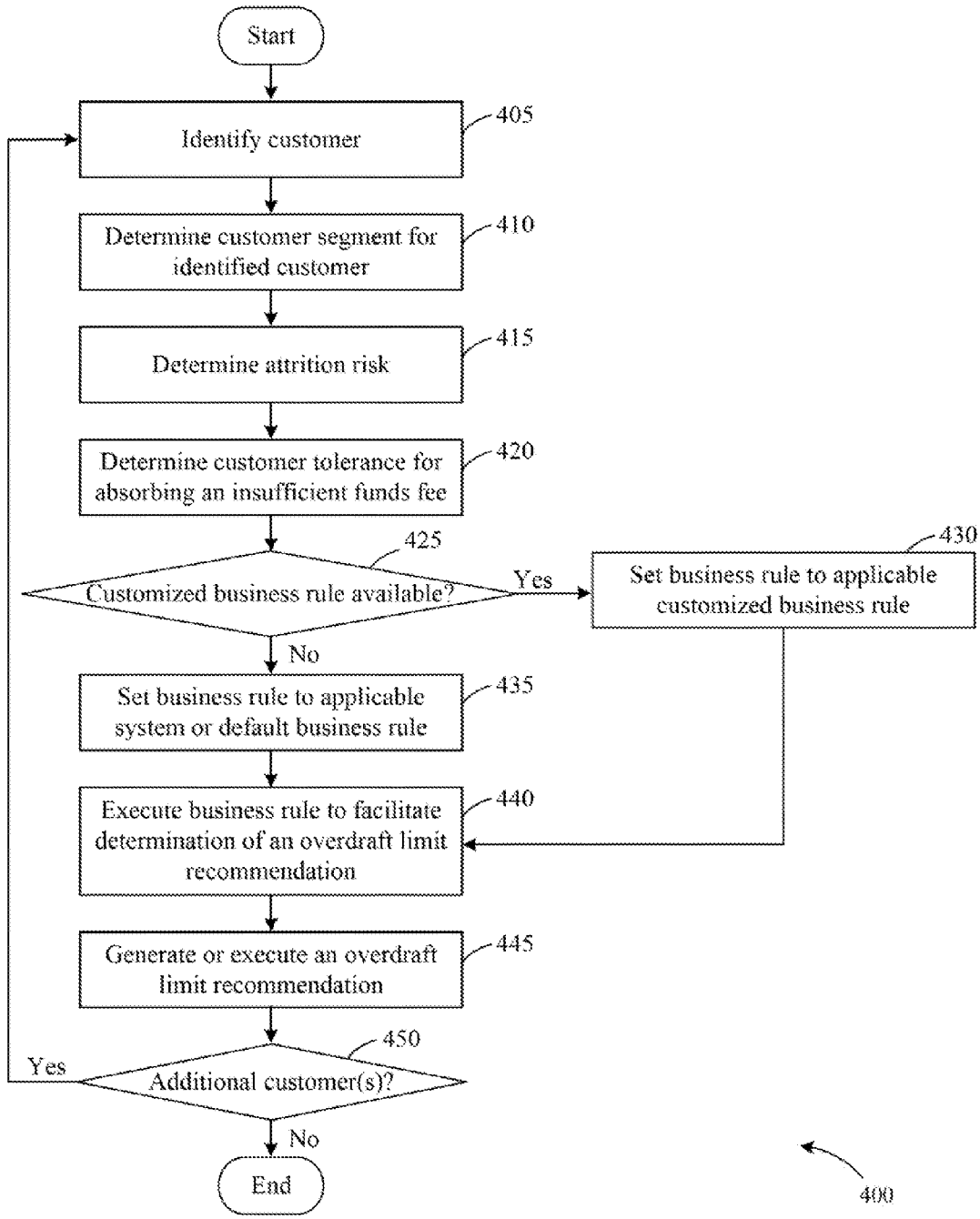
FIG. 4 illustrates a flow diagram of an example method for proactively recommending and/or implementing an action associated with an NSF condition, according to an illustrative embodiment of the invention.

FIG. 4 illustrates a flow diagram of an example method 400 for proactively recommending and/or implementing an action associated with a potential NSF condition, according to an illustrative embodiment of the invention. More specifically, FIG. 4 illustrates a flow diagram of an example method for determining overdraft limits for one or more financial institution customers. The method 400 may be performed by a suitable financial service provider system and/or associated optimization computers, such as the financial service provider system 105 and/or optimization computers 160 illustrated in FIG. 1. The method 400 may begin at block 405.

At block 405, a customer may be identified for an NSF optimization. A wide variety of suitable methods and/or techniques may be utilized to identify a customer. For example, a request to perform an NSF optimization may be received from a financial institution, and the customer may be identified by evaluating information included in the request. As another example, identification information may be obtained for a plurality of different customers, and one or more individual customers may be identified for processing. For example, a batch process may be performed that processes individual customers.

Once a customer has been identified at block 405, operations may continue at block 410. At block 410, a customer segment may be identified for the customer. The operations that may be performed at block 410 to identify a customer segment may be similar to those described above with reference to block 210 of FIG. 2. At block 415, an attrition risk may be determined for the customer. The operations that may be performed at block 415 to determine an attrition risk may be similar to those described above with reference to block 215 of FIG. 2. At block 420, a customer tolerance for absorbing an NSF fee may be identified for the customer. The operations that may be performed at block 420 to determine a customer tolerance may be similar to those described above with reference to block 220 of FIG. 2. Additionally, one or more business rules to execute may be identified for the customer in a similar manner as that described above with reference to FIG. 2.

At block 425, a determination may be made as to whether a customized business rule is currently applicable. For example, a determination may be made as to whether a client-specified business rule is applicable to any number of the determined factors associated with the customer (e.g., the determined customer segment value, the determined attrition risk, the determined customer tolerance, etc.). Assuming a determined customer segment of "X", a determined attrition risk score of "Y", and a determined customer tolerance of "Z", a determination may be made as to whether a client-specified business rule is applicable to the determined values. If it is determined at block 425 that a customized or client-specified business rule is applicable, then operations may continue at block 430. At block 430, an identification of a business rule to be executed may be set to the customized business rule. Operations may then continue at block 440 described in greater detail below.

If, however, it is determined at block 425 that a customized or client-specified business rule is not applicable, then operations may continue at block 435. At block 435, an applicable default or financial service provider system business rule may be identified, and the identification of the business rule to be executed may be set to the default business rule. A wide variety of default business rules may be utilized as desired in various embodiments of the invention. In certain embodiments, default business rules may be generated by the financial service provider system 105 based upon an analysis of historical customer data (e.g., overdraft data, account balance data, attrition data, etc.) for any number of customers over a predetermined period of time (e.g., the last six months, the last year, etc.). During the analysis, suitable cutoff points and/or thresholds may be identified for attrition risk and/or customer tolerance. In certain embodiments, respective cutoff points and/or thresholds may be determined for different customer segments. As desired, default business rules may be subsequently modified by financial institution clients of the financial service provider. In this regard, client preferences that differ from default assumptions may be captured. Following the setting of a default business rule as an applicable business rule at block 435, operations may continue at block 440.

Any number of business rules may be established and/or utilized as desired in various embodiments of the invention. Additionally, the business rules utilized in association with establishing overdraft limits may be different from the business rules utilized to process identified NSF conditions. In certain embodiments, a business rule may be utilized to determine a base overdraft amount for a customer. For example, a business rule may be utilized to identify a base overdraft amount for a customer within a given segment having a given attrition risk and customer tolerance. As desired, the base overdraft amount may be adjusted utilizing one or more additional business rules. In other words, one or more variable components for an overdraft amount may be determined utilizing one or more additional business rules, and the variable component(s) may be utilized to adjust a base overdraft amount. In this regard, individualized overdraft amounts may be tailored to specific customers.

At block 440, which may be reached from either block 430 or block 435, the applicable business rule(s) may be executed or applied in order to determine an overdraft limit for the customer. For example, in certain embodiments, a value or result generated by the application of the business rule(s) may be mapped to an overdraft limit value. As desired, a range of business rule results may be mapped to a single overdraft limit value. As another example, application of the business rule(s) may produce the overdraft limit for a customer. One example of the operations that may be performed to determine an overdraft limit for a customer is described in greater detail below with reference to FIG. 5.

At block 445, an overdraft limit recommendation may be generated and/or executed. For example, a message or notification including information associated with a determined overdraft limit may be communicated to a financial institution computer 140. As desired, a single message may be utilized to provide recommended overdraft limits for a plurality of customers. In certain embodiments, the message may be communicated in response to a received request to determine one or more recommended overdraft limits. As another example, implementation or execution of the recommended overdraft limit may be instructed. For example, an instruction to set, adjust, or establish respective overdraft limits for one or more customers and/or customer accounts may be communicated to a suitable financial institution computer 140. Other actions may be taken as desired based upon the identification of an overdraft limit recommendation. For example, a customer may be approved for a short-term loan that falls within a determined overdraft limit.

At block 450, a determination may be made as to whether any additional customers are available for performing NSF optimization. If it is determined at block 450 that an additional customer is available, then operations may continue at block 405, and a next customer may be identified for evaluation. If, however, it is determined at block 450 that no additional customers are available, then operations may end.

The method 400 may end following block 450.

Figure 5:
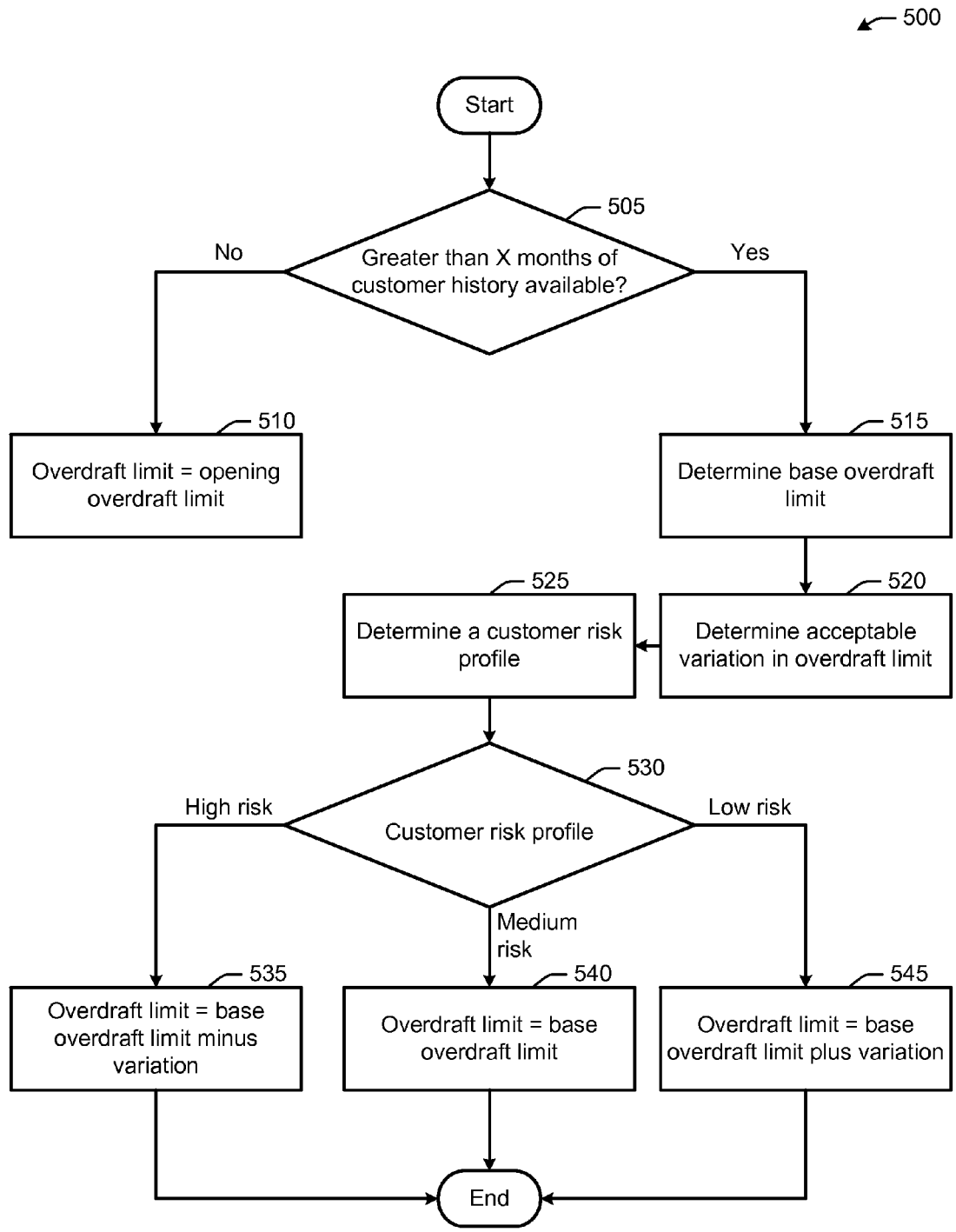
FIG. 5 illustrates a flow diagram of an example method for calculating an overdraft limit, according to an illustrative embodiment of the invention.

As mentioned above, a wide variety of suitable algorithms, business rules, and/or processing techniques may be implemented in order to determine an overdraft limit for a customer. FIG. 5 illustrates a flow diagram of an example method 500 for calculating an overdraft limit, according to an illustrative embodiment of the invention. The method 500 is one example of the operations that may be performed at block 440 illustrated in FIG. 4. As such, the method 500 may be performed by a suitable financial service provider system and/or associated optimization computers, such as the financial service provider system 105 and/or optimization computers 160 illustrated in FIG. 1. The method 500 may begin at block 505.

At block 505, a determination may be made as to whether sufficient individual customer history is available for determining an overdraft limit that is tailored to or that is specific to an identified customer. For example, a determination may be made as to whether an available history of customer account data satisfies a predetermined time threshold. A wide variety of time thresholds may be utilized, such as a threshold of six (6) or more months, or some other suitable threshold of "X" months.

If it is determined at block 505 that a sufficient individual customer history is not available, then operations may continue at block 510. At block 510, an overdraft limit for the customer may be set to a default or opening overdraft limit. As desired, a default overdraft limit may be determined based upon preferences and/or criteria associated with a financial institution. In other embodiments, a default overdraft limit may be established by the financial service provider. Additionally, in certain embodiments, the same opening overdraft limit may be utilized for all customers failing to have a sufficient history available. In other embodiments, an opening overdraft limit may be determined based upon one or more criteria associated with the customer, such as an initial deposit amount for a customer account or a current balance of an account. One example of establishing an opening overdraft limit based upon an initial deposit amount is set forth in Table 1 below.

TABLE 1

Example Opening Overdraft Limits

| Initial Deposit Amount | Opening Overdraft Limit |
|---|---|
| $0-$100 | $ 0 |
| $100-$250 | $ 25 |
| $250-$500 | $100 |
| $500-$1000 | $200 |
| $1000-$2000 | $400 |

TABLE 1-continued

Example Opening Overdraft Limits

| Initial Deposit Amount | Opening Overdraft Limit |
| --- | --- |
| $2000-$5000 | $ 500 |
| greater than $5000 | $1000 |

Other opening overdraft limits may be utilized as desired, and the limits set forth in Table 1 are provided by way of example only. Following the establishment of an opening overdraft limit, the overdraft limit may be revisited at a later point in time. For example, once sufficient aggregate customer history has been obtained, the opening overdraft limit may be reviewed and modified in light of the customer history.

If, however, it is determined at block 505 that a sufficient individual customer history is available, then operations may continue at block 515. At block 515, a base overdraft limit for the customer may be determined or calculated. A wide variety of suitable methods and/or techniques may be utilized as desired to determine a base overdraft limit. In certain embodiments, the customer history data may be evaluated in order to determine a segment for the customer. The base overdraft limit may then be determined based upon the customer segment. For example, utilizing the four example customer segments illustrated in FIG. 3, a base overdraft limit may be determined as set forth in Table 2 below.

TABLE 2

Example Base Overdraft Limits

| Customer Segment | Base Overdraft Limit |
| --- | --- |
| "1" | $1250 |
| "2" | $1000 |
| "3" | $ 250 |
| "4" | $ 200 |

Other base overdraft limits may be utilized as desired, and the base overdraft limits set forth in Table 2 are provided by way of example only. Additionally, in certain embodiments, one or more factors other than a customer segment may be utilized to determine a base overdraft limit for a customer. For example, a business rule that considers a customer segment, an attrition risk, and/or a customer tolerance may be utilized to determine a base overdraft limit for the customer. In this regard, base overdraft limits may be determined in accordance with a wide variety of financial institution and/or service provider preferences.

In certain embodiments of the invention, a base overdraft limit may be adjusted by a variable amount. As desired, the variable amount may be specific to the customer. At block 520, an acceptable variation in an overdraft limit may be determined. A wide variety of suitable methods, formulas, algorithms, and/or techniques may be utilized as desired to determine a variable amount for an overdraft limit. In certain embodiments, a variable amount may be determined based at least in part upon an NSF capacity ratio associated with the customer, such as a highest NSF capacity ratio over a desired historical time period (e.g., the past six months, the past year, etc.). One example formula for calculating a variable amount is set forth in equation two (2) below:

$$VAR\_AMOUNT = PRED\_AMOUNT \cdot \left(\frac{NSF\_FEES}{AVERAGE\_MONTHLY\_DEPOSITS}\right) \quad (2)$$

With reference to equation (2), the variable amount may be determined by dividing the total amount of NSF fees incurred over a desired historical time period (e.g., the past month, the past two months, the past six months, etc.) by an average of the monthly deposits associated with the customer. The result of the ratio or division may then be multiplied by a suitable predetermined amount in order to determine the variable amount. In certain embodiments, the predetermined amount may be the average monthly deposit amount, although other suitable amounts may be utilized. Although equation (2) sets forth one example formula for determining a variable overdraft amount, other formulas and/or methods may be utilized as desired to determine a variable amount.

At block 525, a risk profile for the customer may be determined. A wide variety of factors may be taken into account when determining a risk profile for the customer, such as the customer segment, an attrition risk, a customer tolerance, a customer value, and/or a determination of whether NSF fees are likely to be recovered. A wide variety of different risk profiles may be utilized as desired in various embodiments. For example, a determination may be made as to whether the customer is a "low" risk, "medium" risk, or "high" risk customer. In certain embodiments, a customer's risk profile is derived at least in part from an attrition risk associated with the customer. Additionally, in certain embodiments, the determined risk profile may be utilized at block 530 to determine whether the variable amount will be subtracted from the base overdraft amount, added to the base overdraft amount, or disregarded. For example, if previous overdraft fees have been incurred, and the overdraft fees resulted in curing NSF conditions, then a customer may be a relatively low risk customer, and the base overdraft limit amount may be increased to accommodate the customer.

If it is determined at block 530 that the customer is a "high" risk customer, then operations may continue at block 535. At block 535, the determined variable amount for the overdraft limit may be subtracted from the base overdraft limit for the customer. For example, utilizing an example customer that is determined to be situated in the second customer segment illustrated in FIG. 3, a base overdraft limit may be determined to be $1000. If the customer has typical or average deposits of approximately $2000 per month, and the customer has incurred three $35 NSF fees over that past month (or the past two months), then the total amount of NSF fees may be calculated as $105. The variable overdraft amount may then be calculated utilizing equation (2) as $105. This variable overdraft amount may be subtracted from the base overdraft limit, resulting in a modified overdraft limit of $895 for the customer.

If it is determined at block 530 that the customer is a "medium" risk customer, then operations may continue at block 540. At block 540, the determined variable amount for the overdraft limit may be disregarded. Accordingly, the base overdraft limit for the customer may be established as the overdraft limit for the customer. If it is determined at block 530 that the customer is a "low" risk customer, then operations may continue at block 545. At block 545, the determined variable amount for the overdraft limit may be added to the base overdraft limit for the customer. For example, utilizing an example customer that is determined to be situated in the second customer segment illustrated in FIG. 3, a base overdraft limit may be determined to be $1000. If the customer has typical or average deposits of approximately $2000 per month and the customer has incurred one $35 NSF fee over that past month (or the past two months), then the total amount of NSF fees may be calculated as $35. The variable overdraft amount may then be calculated utilizing equation (2) as $35. This variable overdraft amount may be added to the base overdraft limit, resulting in a modified overdraft limit of $1035 for the customer.

As a result of the operations illustrated and described in conjunction with FIG. 5, an individual overdraft limit may be established for a customer. As desired, the individual overdraft limit may take a wide variety of factors into consideration, such as a customer's value to a financial institution, an attrition risk for the customer, and/or a customer tolerance for absorbing NSF fees. Additionally, in certain embodiments, a base overdraft limit may be adjusted based upon a customer's history of incurring and/or paying NSF fees.

The method 500 may end following either block 535, block 540, or block 545.

The operations described and shown with reference to the above methods may be carried out or performed in any suitable order as desired in various embodiments of the invention. Additionally, in certain embodiments, at least a portion of the operations may be carried out in parallel. Furthermore, in certain embodiments, less than or more than the operations described herein may be performed.

In addition to determining overdraft limits for customers, NSF optimizations may be utilized for a wide variety of other purposes. For example, NSF optimizations may be utilized to determine account types and/or associated fees that will be provided for certain customers. For example, a financial institution may offer fee-based checking as opposed to free checking. The financial institution may do so in order to increase non-interest income. In certain embodiments, a pricing structure may be utilized by the financial institution, and different fees and/or account types will be offered to different customers. As desired, a wide variety of customer factors or attributes, such as those described above in conjunction with NSF optimizations, may be taken into account to determine product offerings and/or pricing for various customers. Additionally, for financial institutions that are switching or migrating existing free checking customers to fee-based checking accounts, these customer factors may be utilized to identify appropriate candidates for migration. In this regard, financial institutions may obtain additional non-interest income from certain customers while still retaining fee sensitive customers, such as high value fee sensitive customers.

As one simplified example of determining product offerings, a financial institution may offer four types of checking accounts. Example account types may include a flat fee checking account, an extended flat fee checking account, a regular checking account, and a free checking account. The flat fee checking option may typically be utilized for accounts with relatively low balances and relatively moderate account activity (e.g., 10-15 checks per month). The extended flat fee checking option may have a higher fee than the flat fee checking option, and the extended flat fee option may be utilized for accounts with relatively low balances and higher account activity (e.g., more than 15 checks per month). The regular checking account option may be utilized for accounts in which unlimited checking is allowed, and the regular checking account option may be associated with an established fee schedule. For example, a base monthly fee and/or a fee for each check or other transaction (e.g., electronic transaction, ATM withdrawal, etc.) may be charged. As desired, the fees may be reduced or eliminated in the event that a minimum balance (e.g., a minimum daily balance, etc.) is maintained or in the event that other types of transactions (e.g., automatic deposits, etc.) and/or customer behavior (e.g., use of online banking and/or bill payment) occurs. The free checking option may be utilized for the most valuable customers and/or for customers that maintain a predetermined account balance and/or that otherwise satisfy a set of conditions (e.g., total asset on deposit conditions, loan or credit account conditions, transaction type conditions, customer behavior conditions, etc.). The product offerings described above are provided by way of example only, and other offerings may be utilized as desired in other embodiments of the invention.

In certain embodiments, customers may be mapped to the various product offerings as a result of evaluating at least a portion of the information described above for NSF optimizations. For example, customers may be mapped to the product offerings in accordance with the determined customer segments. As one example utilizing the segments illustrated in FIG. 3, a first segment customer may be mapped to a free checking account, a second segment customer may be mapped to a regular checking account, a third segment customer may be mapped to a flat fee checking account, and a fourth segment customer may be mapped to an extended flat fee checking account. Additionally, in certain embodiments, similar account fees may be utilized for all of the customers assigned to a particular type of account. In other embodiments, account fees may be customized or tailored on an individualized basis or for subsets of customers. As desired, fees and/or product offerings may be periodically adjusted as additional historical data becomes available for the customers.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. A special-purpose computer may be a general-purpose computer that is programmed to perform one or more of the steps discussed herein. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-readable medium having one or more computer-readable programs comprising code or program instructions embodied therein, wherein said one or more computer-readable programs, upon execution, implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention will come to mind to one skilled in the art to which this invention pertains and having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method, comprising:
   receiving, by a financial system comprising one or more computers, an identification of a first account of a customer of a financial institution, wherein the first account is a deposit account at the financial institution;
   analyzing, by the financial system, interest income and non-interest income attributable to one or more accounts of a plurality of accounts that the customer has with the financial institution, wherein the one or more accounts includes the first account;
   determining, by the financial system, a customer tolerance for paying an insufficient funds fee based upon an actual or potential insufficient funds (NSF) condition associated with the first account; and
   determining, by the financial system, a recommended next action associated with the first account based at least in part on the customer tolerance, wherein the recommended next action is associated with the actual or potential NSF condition associated with the first account.

2. The computer-implemented method of claim 1, wherein the analyzing the interest income and the non-interest income is performed as part of a calculation of a customer segment associated with the customer, wherein the customer segment reflects a value of the customer to the financial institution based upon the interest income and the non-interest income.

3. The computer-implemented method of claim 1, further comprising:
   determining, by the financial system, an attrition risk for the customer, wherein the attrition risk indicates a likelihood of the customer terminating at least one relationship with the financial institution,
   wherein the recommended next action is further based upon the determined attrition risk.

4. The computer-implemented method of claim 3, wherein the attrition risk is based upon a predictive model receiving one or more attributes of the customer.

5. The computer-implemented method of claim 1, wherein the recommended next action is associated with the actual NSF condition, and the identification of the account is received as a result of the actual NSF condition.

6. The computer-implemented method of claim 1, wherein at least one of the interest income or the non-interest income is based upon a second account of the plurality of accounts that the customer has at the financial institution.

7. The computer-implemented method of claim 6, wherein the first account is a first deposit account, and wherein the second account is one of (i) a second deposit account, (ii) a credit account, or (iii) a loan account.

8. The computer-implemented method of claim 1, wherein determining the recommended next action is based upon executing a business rule associated with one of (i) the financial system or (ii) the financial institution.

9. The computer-implemented method of claim 1, further comprising:
   executing or directing, by the financial system, an execution of the recommended next action.

10. The computer-implemented method of claim 1, wherein the recommended next action comprises one or more of (i) levying an NSF fee, (ii) modifying an amount of the NSF fee, (iii) waiving the NSF fee, (iv) establishing or modifying an overdraft limit for the first account, or (v) extending the customer a short-term loan for any overdraft amount of the first account.

11. A system, comprising:
    at least one memory that stores computer-executable instructions;
    at least one processor in communication with the at least one memory, wherein the at least one processor is configured to execute the computer-executable instructions to:
    receive an identification of a first account of a customer of a financial institution, wherein the first account is a deposit account at the financial institution;
    analyze interest income and non-interest income attributable to one or more accounts of a plurality of accounts that the customer has with the financial institution, wherein the one or more accounts includes the first account;
    determine a customer tolerance for paying an insufficient funds fee based at least in part on an actual or potential insufficient funds (NSF) condition associated with the first account; and
    determine a recommended next action associated with the first account based at least in part on the customer tolerance, wherein the recommended next action is associated with the actual or potential NSF condition associated with the first account.

12. The system of claim 11, wherein the at least one processor analyzes the interest income and the non-interest income as part of a calculation of a customer segment associated with the customer, wherein the customer segment reflects a value of the customer to the financial institution based upon the interest income and the non-interest income.

13. The system of claim 11, wherein the at least one processor is further configured to execute the computer-executable instructions to:
    determine an attrition risk for the customer, wherein the attrition risk indicates a likelihood of the customer terminating at least one relationship with the financial institution; and determine the recommended next action based upon the determined attrition risk.

14. The system of claim 13, wherein the attrition risk is based upon a predictive model receiving one or more attributes of the customer.

15. The system of claim 11, wherein the recommended next action is associated with the actual NSF condition, and the identification of the account is received as a result of the actual NSF condition.

16. The system of claim 11, wherein at least one of the interest income or the non-interest income is based upon a second account of the plurality of accounts that the customer has at the financial institution.

17. The system of claim 16, wherein the first account is a first deposit account, and wherein the second account is one of: (i) a second deposit account, (ii) a credit account, or (iii) a loan account.

18. The system of claim 11, wherein the at least one processor is configured to determine the recommended next action based upon executing a business rule associated with one of (i) the financial system or (ii) the financial institution.

19. The system of claim 11, wherein the at least one processor is further configured to execute the computer-executable instructions to:
execute or direct, by the financial system, an execution of the recommended next action.

20. The system of claim 11, wherein the recommended next action comprises one or more of (i) levying an NSF fee, (ii) modifying an amount of the NSF fee, (iii) waiving the NSF fee, (iv) establishing or modifying an overdraft limit for the first account, or (v) extending the customer a short-term loan for any overdraft amount of the first account.

\* \* \* \* \*